3,058,853
METHOD FOR PRODUCING A THERMOPHILE-FREE STARCH AND THE PRODUCT THUS PRODUCED
Otto B. Wurzburg, Whitehouse Station, and Leo H. Kruger, Franklin Park, N.J., assignors to National Starch and Chemical Corporation, New York, N.Y., a corporation of Delaware
No Drawing. Filed Oct. 24, 1960, Ser. No. 64,300
7 Claims. (Cl. 127—70)

This invention relates to a method for producing a thermophile-free starch, particularly suitable for food use. More specifically, it deals with a method for treating aqueous suspensions of granular starch with peroxy aliphatic acids which serve not only to destroy bacteria generally, but particularly the thermophilic type of bacteria and their spores. The starch granules resulting from the process of our invention are characterized by excellent whiteness, absence of undesirable taste or odor, and especially by the absence of any significant amounts of thermophilic organisms. The starch is not physically damaged or degraded by the process.

The term "starch," as used herein, includes not only unmodified starch from any vegetable source, such for example as corn, tapioca, waxy maize, potato, sago, rice or wheat, but also starch which has been modified in any desired manner, such for example as by oxidation, partial hydrolysis, cross-linking, esterification, etherification or other treatment. It should be emphasized that the action of the peroxy aliphatic acids upon the thermophilic organisms is entirely independent of, and irrelevant to, the particular starch type being treated.

Heretofore, the destruction of thermophilic bacteria and spores in starch posed serious problems for the starch industry, and particularly when dealing with the manufacture of starches to be used in food preparations.

Ideally, the bactericidal chemical should be one which is easily and simply applied; it should be capable of destroying thermophilic bacteria and spore formers at low concentrations of the chemical; it must exert this activity immediately upon addition to the aqueous slurry of starch granules; it must retain its stability, potency and effectiveness for a period of at least several hours in the aqueous slurry as well as in the subsequent filter cake after the slurry is partially dewatered; it must volatilize or decompose into volatile or non-toxic residues during the ultimate drying process; neither the bactericidal agent nor its by-products should, in the concentrations used, physically damage the starch or adversely affect its taste, color or odor during any step in the process; the agent itself must be relatively non-toxic and any by-products remaining in the starch must, of course, also be non-toxic.

In the past, attempts have been made to solve this problem by the use of certain inorganic peroxy compounds, especially hydrogen peroxide. However, the use of the latter product was accompanied by serious disadvantages. It is readily destroyed by catalase, an oxidative type enzyme often found in certain types of bacteria. This reduces its effectiveness, so that relatively large amounts of the hydrogen peroxide are often required. Even with the use of such large amounts, it is sometimes found that certain types of bacteria and spores are particularly resistant to destruction, and other methods of destroying them must be found. When large amounts of hydrogen peroxide are used, there is real danger of causing the starch to be degraded by the chemical during the processing and drying of the starch, resulting in a starch with undesirably low viscosity characteristics. In an attempt to avoid such degradation, it has been necessary to maintain the pH of the reaction mass within narrow and precise ranges, making the use of the inorganic peroxide quite complicated and difficult. Furthermore, hydrogen peroxide produces a discernible and undesirable off-taste in certain cereal starches, such as corn, waxy maize and the like. Finally, it is difficult to completely destroy residual hydrogen peroxide during the drying of the treated starch, and such residual hydrogen peroxide can adversely affect the color and taste of foods in which the starch is employed. Thus, it is seen that there is a real need in the starch industry for an effective method of destroying thermophilic bacteria and spores, unattended by the above-described disadvantages.

We have now found that by contacting starch granules in an aqueous slurry with an "organic" peroxy compound, such as peroxy aliphatic acids, in an acidic medium, it is possible to destroy thermophilic bacteria and spores in a remarkably efficient and simple manner.

In general terms, the process of our invention may be described as follows:

(1) Prepare an aqueous slurry of starch. If the pH of the slurry is above 7, it should preferably be adjusted to 7 or below, by addition of hydrochloric or other acid.

(2) Add the peroxy aliphatic acid. The pH of the slurry after the addition of the peroxy aliphatic acid should be within the range 3 to 6.5, and if necessary the proper adjustment is made, by addition of acid or alkali, as the case may be.

(3) Thereafter, the treated starch is recovered in dry form, generally by dewatering and drying.

The process is simple and easily applied; low concentrations of the peroxy aliphatic acid serve to completely and quickly destroy the thermophilic bacteria and spores; the peroxy aliphatic acid is readily volatilized during the drying operation, leaving no perceptible residue in the starch, and obviating the problem of undesirable odor, taste, color or toxicity.

PREPARATION OF AQUEOUS SLURRY OF STARCH

The aqueous slurry of starch granules, usually referred to in the art as "starch milk," may be obtained in at least four ways; (a) at any desired point during the starch refining operation, but before drying of the starch; (b) the unmodified starch granules, if dry, may be resuspended in water; (c) if the starch has first been subjected to chemical modification, it may be treated while still in the aqueous slurry in which said modification took place; (d) dry modified starch may be resuspended in water to form a slurry.

The aqueous slurry of starch ordinarily contains from about 18% to 45% starch solids, having a density of about 10° to about 26° Baumé. Although we prefer that the slurry have a solids content of from 32% to 39%, the concentration of starch in the slurry is not critical for the operation of our process.

PEROXY TREATING AGENTS

The treating agents used in this invention are the peroxy aliphatic acids, also sometimes referred to as the acyl hydroperoxides. Representatives examples of this class include peroxypropionic, peroxybutyric and peroxyacetic acids, the latter being preferred. Another name for peroxyacetic acid is, of course, peracetic acid.

TREATMENT OF THE STARCH

The peroxy aliphatic acid is added, with agitation, to the starch slurry. As previously noted, the pH of the slurry should preferably be no higher than 7 when the peroxy aliphatic acid is added, and immediately thereafter the pH should be within the range 3 to 7, and preferably 4 to 5.5. The adjustment to the desired pH range may be made either before or after the peroxy aliphatic acid is added to the slurry. The amount of the peroxy aliphatic acid may range from 0.0015% to about 1.0%, based on the dry starch weight, although we prefer to employ from 0.01% to 0.5%.

The temperature of the aqueous starch slurry during the treatment with the peroxy aliphatic acid may range from about 40° F. to about 125° F., excellent results being obtained at ordinary room temperature.

The length of time that the peroxy aliphatic acid is to be kept in contact with the starch slurry cannot be stated in absolute terms, and will vary considerably, depending upon the particular circumstances. This will be understood when it is remembered that different starch batches, before treatment, may vary greatly in the number of thermophilic organisms present. There are indeed cases where the original starch milk may have essentially no such organisms, and it is only desired to prevent contamination by thermophilic bacteria during the dewatering and drying operation in the plant. In such cases, it is sufficient to add the peroxy aliphatic acid to the milk just before dewatering and drying. If the original starch was already contaminated by thermophiles, then the milk may be allowed to remain in contact with the peroxy aliphatic acid for anywhere from a few minutes to two or three hours, before dewatering. It is a matter of the simplest bacteriological analysis to determine at any point whether such bacteria have been substantially destroyed.

DRYING THE TREATED STARCH

As stated, the treated starch is ordinarily recovered in dry form, by dewatering and drying. The drying may take place at temperatures below the gelatinization point of the starch, so that the treated starch is recovered in the form of its original, ungelatinized granules. Or, if desired, the starch milk may be subjected to high-temperature drying, such as spray drying or passage over heated drums, thus simultaneously gelatinizing and drying the product. If desired, the peroxy aliphatic acid may be incorporated in the starch milk immediately prior to such spray or drum drying operation, so that in effect the starch is treated, gelatinized and dried in a single operation.

The following examples will further illustrate the embodiment of our invention. In these examples, all parts are by weight, unless otherwise specified.

*Example I*

In this example we illustrate the effect of various treatments of starch, as follows:

A. Starch washed with distilled water only.
B. Starch treated with an "inorganic" peroxy compound.
C. Starch treated with an "organic" peroxy compound.

A. As our starting material, we used a commercially dry starch having an average count of heat-resistant (thermophilic) organisms of 595, and a flat-sour count of 400. Using sterile equipment, we mixed 100 parts of the starch with 150 parts distilled water, to form a starch milk. The pH was 5 (if it had not been, it would have been adjusted to approximately that point by the addition of acid, such as dilute hydrochloric acid, or by the addition of alkali, as the case might be). The slurry was agitated for three hours, and the starch was then filtered from the slurry and dried in a hot air dryer.

B. Two 100-part slurries were prepared, using the same dry starch and procedure as in "A" above. To one slurry, 0.03% of hydrogen peroxide (100%), based on the dry weight of the starch, was then added. To the second slurry we added 0.07% of the hydrogen peroxide, based on the dry weight of the starch. Each slurry was agitated for three hours. The slurries were then filtered and the starch dried as in "A."

C. Four 100-part slurries were prepared, using the same starch and procedure as in "A" above. To one slurry, we added 0.001%, based on the dry starch weight, of peroxyacetic acid (100%). To the second slurry we added 0.01% of the peroxyacetic acid; to the third slurry 0.1%, and to the fourth slurry 1.0% of the peroxyacetic acid. Each slurry was adjusted to a pH of about 5, agitated for three hours, filtered and dried as in "A" above.

Thermophilic bacterial counts were then made on each of the above starches, using the method prescribed by the National Canners Association. The results follow:

| | Average Count Total Thermophiles | Average Count Flat Sour |
|---|---|---|
| Untreated starch (control) | 595 | 460 |
| "A" (washed in water only) | 460 | 335 |
| "B" (0.03% hydrogen peroxide) | 265 | 160 |
| "B" (0.07% hydrogen peroxide) | 110 | 45 |
| "C" (0.001% peroxyacetic acid) | 280 | 280 |
| "C" (0.01% peroxyacetic acid) | 0 | 0 |
| "C" (0.1% peroxyacetic acid) | 0 | 0 |
| "C" (1.0% peroxyacetic acid) | 0 | 0 |

It is seen from the above that with peroxyacetic acid present in the starch slurry to the extent of 0.01% to 1.0%, the thermophiles and flat sour organisms were destroyed. Even with 0.001%, the organism count was reduced considerably, although total destruction was not achieved.

*Example II*

As noted previously, one of the requirements for a good agent for destroying thermophilic bacteria in starch is that it must have no detrimental effects on the viscosity of the starch when the latter is gelatinized in water. Using a waxy maize starch which had been modified by the procedure of Example I of U.S. Patent No. 2,500,950, the following dry samples were prepared:

A. *Washed with water only.*—The procedure followed that shown in Example I-A above.

B. *Treated with hydrogen peroxide.*—The procedure followed that shown in Example I-B, except that we employed 0.187% of the hydrogen peroxide, based on the weight of the starch.

C. *Treated with peroxyacetic acid.*—The procedure followed that shown in Example I-C, except that we used 0.2% of the peroxyacetic acid, based on the weight of the starch.

Paste viscosities of the various dry samples were then determined during pasting in a Brabender viscograph. In each case, 22.9 grams anhydrous starch, 9.2 grams glacial acetic acid and 428 grams distilled water were placed in the Brabender cup. Heating was started at 30° C., with stirring, and the temperature increased 1.5° C. per minute to 95° C., where it was held for 30 minutes. The results follow.

| Sample: | Viscosity (centipoises) at 95° C., after 30 min. |
|---|---|
| Untreated | 430 |
| 0.187% $H_2O_2$ | 315 |
| 0.2% peroxyacetic acid | 430 |

It will be noted that the peroxyacetic acid did not cause the resultant starch slurry to become any thinner than the untreated starch, whereas the hydrogen peroxide caused the starch to become appreciably thinner.

*Example III*

This example illustrates the tendency of hydrogen peroxide to remain in starch as an undesirable residue, as against the complete disappearance of peroxyacetic acid.

Starch samples were treated with hydrogen peroxide and peroxyacetic acid, respectively, as in Examples I-B and I-C, except that 0.7 part of hydrogen peroxide and 1 part of peroxyacetic acid were used, per 100 parts dry starch. After drying, the treated samples were analyzed for residual hydrogen peroxide or peroxyacetic acid. The results follow:

| Treatment—parts per 100 parts starch | Residual—parts per 100 parts starch |
| --- | --- |
| 0.70 parts H₂O₂. | 0.1 part H₂O₂. |
| 1.0 parts peroxyacetic acid. | no detectable residue. |

It will be observed that about one seventh, or 14% of the hydrogen peroxide remained in the dry starch, whereas no detectable amount of the peroxyacetic acid was found.

While the peroxy aliphatic acid is highly effective in destroying thermophilic bacteria, and there would ordinarily be no reason to use it in combination with any other bactericide for the purposes of this invention, it should be noted that combinations of peroxy aliphatic acids with other bactericides are not precluded. Thus, if desired, the peroxy aliphatic acid may be employed in combination with hydrogen peroxide.

The process of our invention is effective regardless of the particular starch being treated. Thus, equally beneficial results were obtained by the use of peroxy aliphatic acid upon unmodified corn starch, tapioca starch, waxy maize starch, sago and other starches, as well as upon starches which had been modified by prior oxidation, hydrolysis, esterification, etherification and cross-linking, as for example by procedures set forth in U.S. 2,500,950 and 2,935,510, as well as by other means well known in the starch art.

Variations in materials, proportions and procedures will be apparent to the practitioner in the art, without departing from the scope of the invention, which is limited only by the following claims.

We claim:
1. A process for producing starch substantially free of thermophilic bacteria, comprising adding to an aqueous slurry of starch granules from 0.001% to 1% of a peroxy aliphatic acid, based on the dry weight of the starch, and then drying the starch, said peroxy aliphatic acid being selected from the group consisting of peroxypropionic, peroxybutyric and peroxyacetic acids.

2. The process of claim 1 in which the peroxy aliphatic acid is peroxyacetic acid.

3. The process of claim 1 in which the starch slurry, before adding the peroxy aliphatic acid, has a pH no higher than 7, and in which said starch slurry after adding the peroxy aliphatic acid has a pH within the range 3 to 7.

4. A process for producing starch substantially free of thermophilic bacteria, comprising adding to an aqueous slurry of starch granules having a pH no higher than 7 from 0.001% to 1% of a peroxy aliphatic acid, based on the dry weight of the starch, maintaining the resultant mixture at a pH within the range 3 to 7, and then dewatering and drying the starch at a temperature below the gelatinization point of said starch, said peroxy aliphatic acid being selected from the group consisting of peroxypropionic, peroxybutyric and peroxyacetic acids.

5. A process for producing starch substantially free of thermophilic bacteria, comprising adding to an aqueous slurry of starch granules having a pH no higher than 7 from 0.001% to 1% of a peroxy aliphatic acid, based on the dry weight of the starch, maintaining the resultant mixture at a pH within the range 3 to 7 and then passing the slurry over heated drums so as to gelatinize and dry the starch, said peroxy aliphatic acid being selected from the group consisting of peroxy-propionic, peroxybutyric and peroxyacetic acids.

6. A process for producing starch substantially free of thermophilic bacteria, comprising adding to an aqueous slurry of starch granules having a pH no higher than 7 from 0.001% to 1% of a peroxy aliphatic acid, based on the dry weight of the starch, maintaining the resultant mixture at a pH within the range 3 to 7 and then spray drying the starch, said peroxy aliphatic acid being selected from the group consisting of peroxy-propionic, peroxybutyric and peroxyacetic acids.

7. In the process of preparing dry starch which comprises taking a starch milk and dewatering and drying said starch, the step of preventing contamination of the starch with thermophilic bacteria which comprises adding to the starch milk, while said milk is at a pH no higher than 7, from 0.001% to 1% of a peroxy aliphatic acid, based on the dry weight of the starch, and then dewatering and drying said starch, said peroxy aliphatic acid being selected from the group consisting of peroxypropionic, peroxybutyric and peroxyacetic acids.

References Cited in the file of this patent

UNITED STATES PATENTS 2,218,221   Schopmeyer et al.   Oct. 15, 1940
2,829,991   Evans et al.   Apr. 8, 1958

OTHER REFERENCES

Manly: Organic Peroxy-Compounds in Industry, the Ind. Chemist, July 1956, vol. 32, pages 271–276.